United States Patent [19]

Miller

[11] Patent Number: 5,300,846
[45] Date of Patent: Apr. 5, 1994

[54] LAMINATION SUPPORT FOR A LINEAR MOTOR

[75] Inventor: Robin M. Miller, Ellington, Conn.

[73] Assignee: Otis Elevator Company, Farmington, Conn.

[21] Appl. No.: 958,207

[22] Filed: Oct. 8, 1992

[51] Int. Cl.$^5$ ............................................. H02K 41/00
[52] U.S. Cl. ..................................................... 310/12
[58] Field of Search ..................... 310/12, 13, 14, 216, 310/217

[56] References Cited

U.S. PATENT DOCUMENTS

| | | | |
|---|---|---|---|
| 3,860,840 | 1/1975 | Laronze | 310/13 |
| 4,665,329 | 5/1987 | Raschbichler | 310/13 |
| 4,894,573 | 1/1990 | Simpson | 310/217 |

Primary Examiner—Steven L. Stephan
Assistant Examiner—Judson H. Jones

[57] ABSTRACT

A biasing apparatus is provided for biasing the laminations of a linear motor primary against one another, thereby tightly packing the laminations together. The biasing apparatus is attached to the backing plate of the primary. The present invention may also comprise an adjustment apparatus for adjusting the amount of force biasing the laminations together.

4 Claims, 3 Drawing Sheets

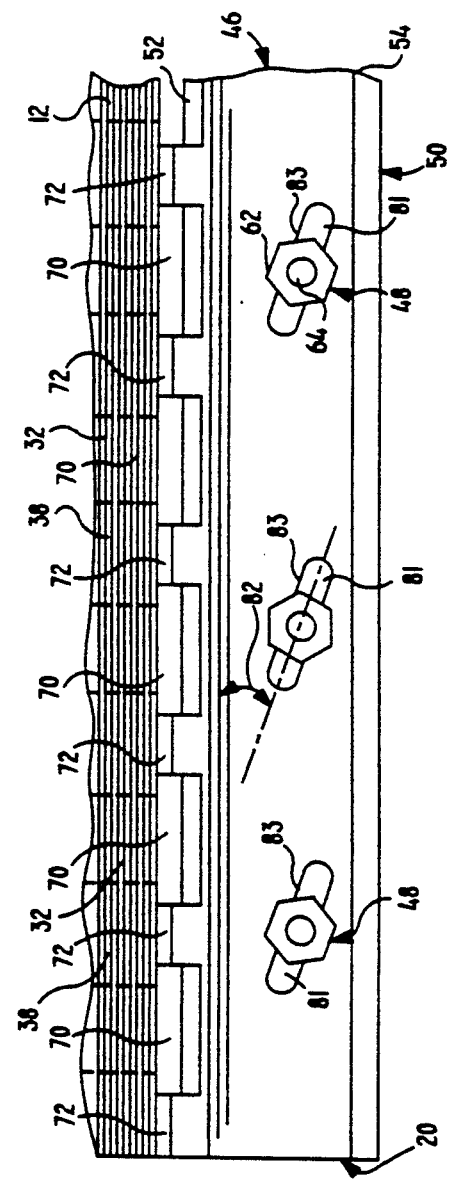
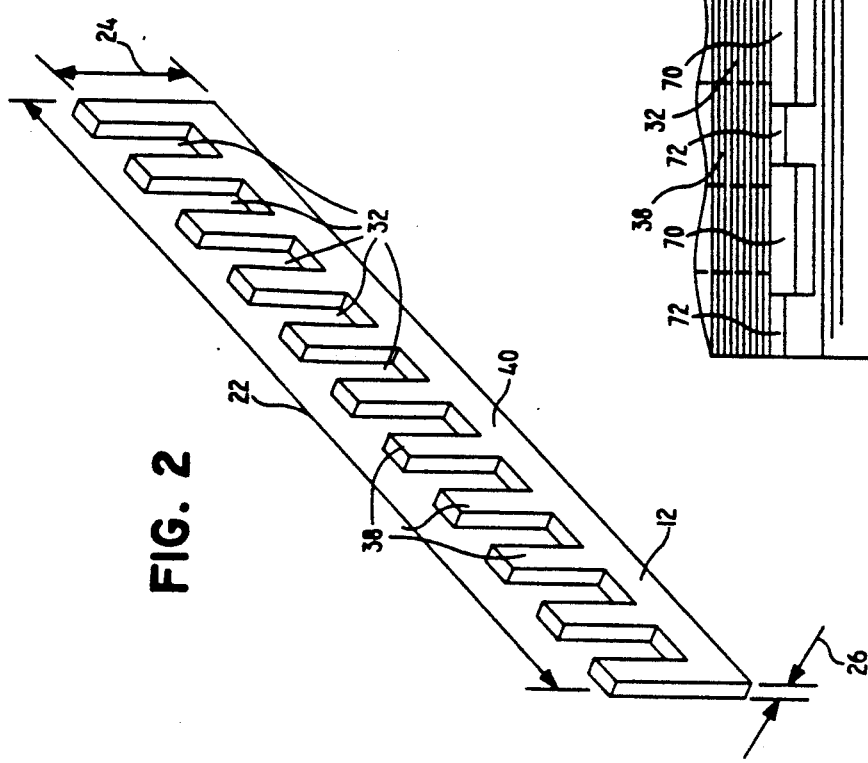

LAMINATION SUPPORT FOR A LINEAR MOTOR

DESCRIPTION

Technical Field

This invention relates to linear motors, and more specifically, to linear motor primaries comprising a plurality of laminations.

Background Art

Linear motors having a primary and a secondary provide a means for linear propulsion which can be used in a variety of different ways. The secondary typically consists of a body of ferromagnetic material having a surface covered by a highly conductive material. That surface lies in a plane parallel to and facing the primary.

The primary consists of a primary body having a length, width, and a height, a backing plate, and a plurality of windings. The primary body is made from a plurality of ferromagnetic laminations positioned side by side, attached along one edge to the ferromagnetic backing plate. Each lamination has a series of notches cut out of the height of the lamination, along the edge opposite that attached to the backing plate. Cumulatively, the notches form channels extending across the width of the primary body, perpendicular to the laminations lengths. The plurality of windings rest in the channels, therefore also perpendicular to the lamination lengths.

When current is introduced into the windings, a magnetic field is created in a plane perpendicular to the direction of the current. Since the lengths of the laminations are theoretically perpendicular to the windings, and the heights of the laminations parallel to one another, the magnetic field perpendicular to the current travels parallel to the length of the laminations. As a result, the parallel running magnetic field travels through and is contained within the length of the ferromagnetic laminations.

The primary body formed from a plurality of laminations has several advantages over one made from a solid block of ferromagnetic material. First, the thin laminations help to maintain the travel path of the magnetic flux in a direction perpendicular to the current direction. Flux traveling in a perpendicular path, through laminations parallel to one another, takes the shortest route possible and does not interfere with flux patterns traveling in adjacent laminations. Both of these characteristics help increase the efficiency of the primary. Second, a body made of laminations minimizes flux path problems caused by defects sometimes found in solid blocks of ferromagnetic material such as deviations in composition and/or lattice structure defects. Theoretically, therefore, a primary body comprised of laminations is preferred over a solid primary body.

In reality, laminated primary bodies have problems as well. In the manufacturing process each lamination has notches either punched or cut out, and either way the lamination is no longer perfectly flat. When the laminations are aligned together, these imperfections cause undesirable spacing and misalignment between laminations. The "fingers" of the laminations extending up between the notches, in particular, tend to "fan" out and are no longer parallel to one another. The resulting primary body has one width at the bottom of the laminations where they are attached to the backing plate and a different, larger one, at the top where the windings enter the channels.

The outward fanning of the laminations at the top of the primary body has at least three negative effects. First, the windings resting in the notches must be longer. Second, the laminations are no longer perpendicular to the direction of the current and parallel to one another, which diminishes the gains created by using laminations. Third, the three phase AC current which "pulses" the power to the linear motor will vibrate the laminations if they are not tightly packed together. The vibrations, in turn, create undesirable noise.

Several methods have been developed to prevent the laminations from fanning out. One method is to run bolts all the way through the bases of the laminations and draw them together. Another method is to process all of the laminations together in a large press, and subsequently weld the edges opposite the notches together. In either case, the solutions only partially correct the problem because the fingers between the notches are still able to fan out.

DISCLOSURE OF THE INVENTION

It is, therefore, an object of the present invention to provide a support capable of keeping both the base and the fingers of the laminations of the primary laminations tightly packed, thereby keeping a greater number of laminations perpendicular to the direction of the current traveling within the windings and parallel to one another.

It is a further object of the present invention to be able to adjust the amount of force pushing the laminations together.

According to the present invention, a biasing means is provided for biasing the laminations of a linear motor primary toward one another. Biasing the laminations toward one another packs the laminations in a tight configuration, thereby eliminating space between laminations and maintaining a greater number of laminations perpendicular to the current traveling through the windings, and parallel to one another. The biasing means is attached to the backing means by an attachment means.

According further to the present invention, the biasing means comprises an adjustment means for adjusting the amount of force biasing the laminations together.

An advantage of the present invention is that it provides support to both the base and the fingers of the primary laminations. Providing support in both areas helps to pack the laminations tightly together, aligning them perpendicular to the direction of current traveling through the windings and parallel to one another, thereby increasing the efficiency of the primary.

These and other objects, features and advantages of the present invention will become more apparent in light of the detailed description of the best mode embodiment thereof, as illustrated in the accompanying drawings.

BRIEF DESCRIPTION OF THE DRAWINGS

FIG. 2 is an diagrammatic view of a lamination.

FIG. 3 is a top sectional view of the type lamination support shown in FIG. 1.

BEST MODE FOR CARRYING OUT THE INVENTION

Figure 1:
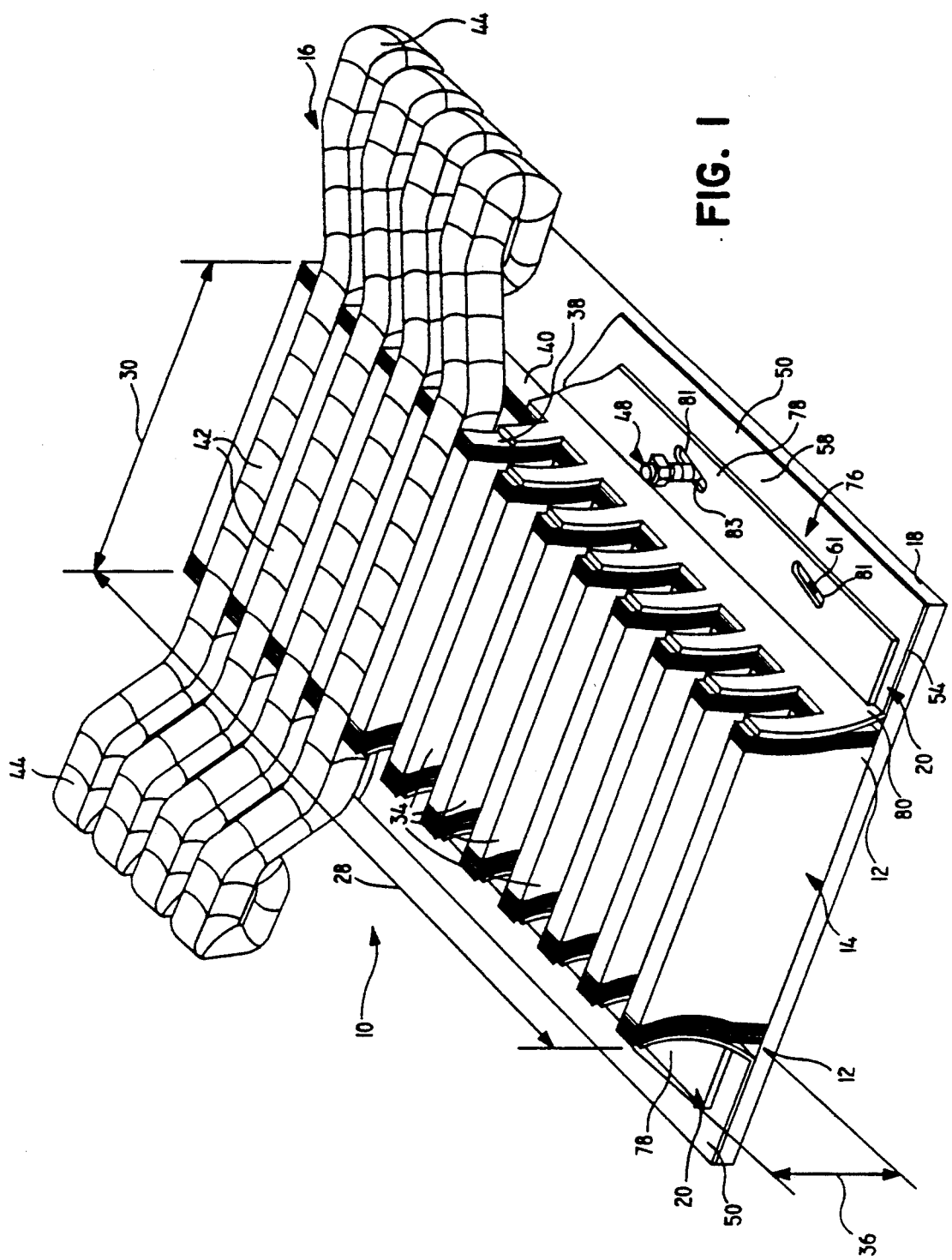
FIG. 1 is an diagrammatic view of a linear motor primary partially constructed.

Referring to FIG. 1, a linear motor primary 10 is shown having a primary body 14, a plurality of windings 16, a backing plate 18, and a pair of lamination supports 20. The primary 10 is part of a linear motor comprising both a primary and a secondary (not shown).

Referring to FIGS. 1 and 2, the primary body 14 is made from ferromagnetic material formed into thin strip having a length 22, a height 24, and a thickness 26. The length 22 of the laminations 12 determines the length 28 of the primary body 14. Theoretically, the collective thicknesses 26 of the laminations 12 determine the width 30 of the primary body 14. In reality, the primary body width 30 depends upon the flatness of the laminations 12 and how tightly they are packed together.

Each lamination 12 has a number of notches 32 removed from its height 24. When the laminations 12 are aligned, the notches 32 collectively form channels 34 that extend across the entire width 30 of the primary body 14, perpendicular to the lengths 22 of the laminations 12. The number of notches 32, and therefore channels 34, is a design feature which depends upon the application. The sections of primary body height 36 that extend between the notches 32 are known as "fingers" 38. The section of the primary body height 36 beneath both the fingers 38 and the notches 32 is referred to as the base 40.

The windings 16 are made from a highly conductive material such as copper. It is known in the art that each winding 16 is actually a large number of individual wires (not shown) bound together and arranged in a loop. Each loop has two straight lengths 42 and two end windings 44 connecting the lengths 42. The lengths 42 lie in the primary body channels 34 and the end windings lie outside the primary body 14.

The backing plate 18 is made from a ferromagnetic material, typically steel. The backing plate 18 has a plurality of slots (not shown) which, after assembly of the primary, typically extend across the entire width 30 of the body 14.

Figure 4:
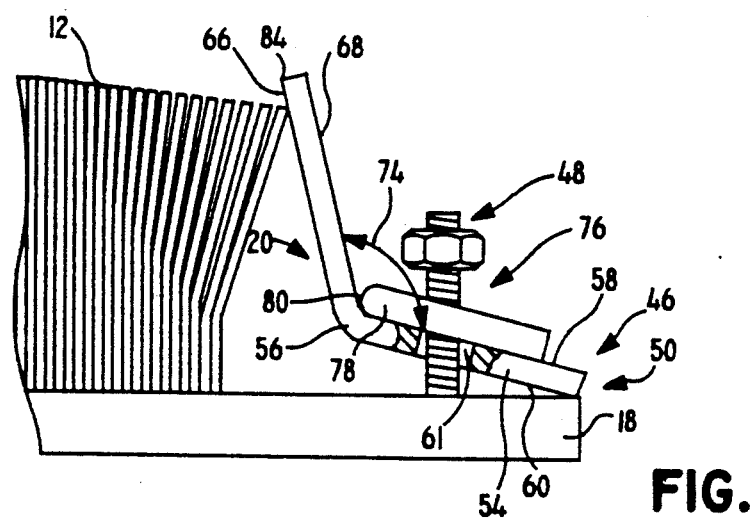
FIG. 4 is an end view of the lamination support shown in FIG. 3, prior to biasing the lamination support against the laminations.
Figure 5:
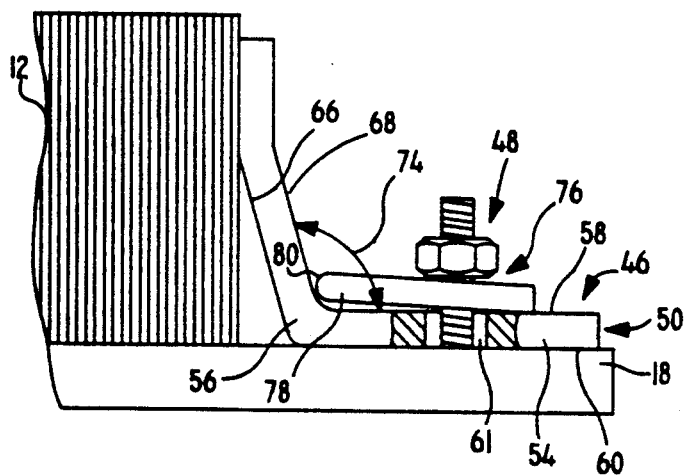
FIG. 5 is an end view of the lamination support shown in FIG. 3, after biasing the lamination support against the laminations.

Referring to FIGS. 3 and 4, the lamination supports comprise a biasing means 46 and an attachment means 48. The biasing means 46 comprises a brace 50 having an upper 52 and a lower 54 leaf fixedly attached to one another along a joint 56. In the preferred embodiment, the joint 56 is a bend between the upper 52 and lower 54 leafs. The lower leaf 54 has a top 58 and a bottom surface 60. The bottom surface 60 faces the backing plate 18. The brace 50 is attached to the backing plate 18 by the attachment means 48 which passes through holes 61 in the lower leaf 54. The attachment means 48 shown is a nut 62 and stud 64 threaded into the backing plate 18. A person of skill in the art will recognize that other attachment means may be used alternatively.

The upper leaf 52 has an inner 66 and an outer surface 68. The inner surface 66 faces the laminations 12. A plurality of notches 70 sized slightly bigger than those of the laminations 12 are removed from the upper leaf 52 in the same spacing as those in the laminations 12. The sections of the upper leaf 52 extending between the notches 70 are also referred to as fingers 72. Since the notches 70 of the upper leaf 52 are slightly bigger than the notches 32 of the laminations 12, the fingers 72 of the upper leaf 52 are slightly smaller than the fingers 38 of the laminations 12. The upper 52 and lower 54 leafs are arranged such that there is an obtuse angle 74 between the outer surface 68 of the upper leaf 52 and the top surface 58 of the lower leaf 54.

The biasing means 20 may also comprise an adjustment means 76. In the best mode, the adjustment means 76 comprises a wedge 78 having a rounded edge 80 which extends the length of the brace 50. The wedge 78 lies on the top surface 58 of the lower leaf 54, and is fixed to the backing plate 18 by the same attachment means 48 as the brace 50 is. Instead of holes 61, however, the wedge 78 has slots 81 which receive the attachment means 48. The slots 81 are aligned parallel to one another, but at an angle 82 to the rounded edge 80 of the wedge 78. The angle 82 is greater than 0° and less than 90°.

Referring to FIG. 1, before assembly of the primary body 14, each lamination 12 is cut to size and a predetermined number of notches 32 are removed. The removal might be punch or by saw. Either way, the finished laminations 12 are typically not perfectly flat. During assembly, a predetermined number of laminations 12 are aligned side by side to form the primary body 14. The notches 32 of the aligned laminations 12 collectively form channels 34 extending across the width 30 of the primary body 14, perpendicular to the length 28 of the primary body 14. Because of the aforementioned flatness imperfections, the collective width of the primary body 14 will be greater then the cumulative sum of the lamination thicknesses 26. It is known in the art that the laminations may be temporarily pressed and bound (not shown) together side by side to correct the imperfections. Typically, the laminations are pressed together hydraulically at great force, thereby plastically deforming them on to one another.

After pressing and binding the laminations 12 together, the block of laminations 12 is welded to the backing plate 18. Specifically, the laminations 12 are welded to the backing plate 18 along the slots (not shown) in the backing plate 18, discussed supra. At this point in the assembly of the primary 10, the laminations 12 are tightly packed and parallel to one another. If the laminations 12 remained in this configuration, the current traveling through the primary windings 16 would be traveling in a direction perpendicular to the laminations 12 because the winding lengths 42 would be resting in a channel 34 which is perpendicular to the laminations 12. When the binding (not shown) is removed, however, the lamination fingers 38 fan out. As a result, the laminations 12 are no longer tightly packed and a large number of them are no longer parallel to one another. The present invention provides the pair of lamination supports 20 to correct this problem.

Referring to FIGS. 3 and 4, on each side of the width 30 of the primary body 14, a brace 50 contacts the outermost lamination 12. The brace 50 is attached to the backing plate 18 by attachment means 48. Fixing the lower leaf 54 of the brace 50 to the backing plate 18 biases the upper leaf 52 against the laminations 12 because of the obtuse angle 74 between the upper 52 and lower 54 leafs. Biasing the laminations 12 causes them to pack together in a tighter configuration, with a greater number standing parallel to one another and consequently perpendicular to the direction of the current flowing through the windings 16.

A wedge 78 may be used in combination with the brace 50 as a means for adjusting the biasing force of the brace 50 against the laminations 12. The wedge 78 lies on the top surface 58 of the lower leaf 54 and is attached to the backing plate 18 by the same attachment means 48 as the brace 50. In contrast to the brace 50, however, the wedge has slots 81 which receive the attachment means 48. The slots 81 allow the wedge 78 to move relative to the attachment means 48 and consequently the brace 50. To adjust the biasing force, the wedge 78 is slid relative to the attachment means 48 until the rounded edge 80 contacts the outer surface 68 of the upper leaf 52. Pushing the upper leaf 52 toward the laminations 12 with the wedge 78 increases the biasing force against the laminations 12. The angle 82 of the slots 81 relative to the rounded edge 80 may vary from 0° to 90°. A more acute angle 82 limits the amount of adjustment possible, but it also distributes a greater percentage of the upper leaf reacting force against the sidewall 83 of the slot 81, thereby facilitating adjustment of the wedge 78.

Although this invention has been shown and described with respect to the detailed embodiments thereof, it will be understood by those skilled in the art that various changes in form and detail thereof may be made without departing from the spirit and scope of the claimed invention.

I claim:

1. A lamination support for a linear motor primary having a plurality of laminations arranged side by side, attached to a backing plate along one edge, comprising:

a biasing means, for biasing the laminations against one another; and an attachment means, for attaching said biasing means to the backing plate.

2. A lamination support for a linear motor primary, according to claim 1, wherein said biasing means comprises:

a brace, having a lower leaf with a top and bottom surface, and an upper leaf with an inner and outer surface, said leafs fixedly attached to each other along a joint such that an obtuse angle exists between said top surface and said outer surface, wherein said brace is attached to the backing plate along said lower leaf by said attachment means, and said upper leaf is biased against the laminations.

3. A lamination support for a linear motor primarY, according to claim 1, wherein lamination support further comprises:

an adjustment means for adjusting the force of said biasing means against the laminations.

4. A lamination support for a linear motor primary, according to claim 2, wherein said lamination support further comprises:

an adjustment means, consisting of a wedge, having an edge and a plurality of slots aligned parallel to one another and at an acute angle to said edge, said wedge attached to the backing plate of the primary by said attachment means extending through said slots, wherein the biasing force of said brace may be adjusted by moving the edge of said wedge in the direction of said upper leaf, thereby moving said upper leaf in the direction of the laminations.

* * * * *